(12) United States Patent
Lee et al.

(10) Patent No.: US 9,536,685 B2
(45) Date of Patent: Jan. 3, 2017

(54) TOUCH PANEL AND MANUFACTURING METHOD THEREOF

(71) Applicant: TPK Touch Solutions (Xiamen) Inc., Xiamen (CN)

(72) Inventors: Yuh-Wen Lee, Zhubei (TW); Hsiang-Lung Hsia, Changhua (TW); Feng Chen, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 132 days.

(21) Appl. No.: 13/893,361

(22) Filed: May 14, 2013

(65) Prior Publication Data

US 2013/0306451 A1   Nov. 21, 2013

(30) Foreign Application Priority Data

May 16, 2012  (CN) .......................... 2012 1 0151066

(51) Int. Cl.
*H01H 9/02* (2006.01)
*H01B 13/00* (2006.01)
*G06F 3/041* (2006.01)

(52) U.S. Cl.
CPC .............. *H01H 9/02* (2013.01); *G06F 3/041* (2013.01); *G06F 2203/04103* (2013.01)

(58) Field of Classification Search
None
See application file for complete search history.

(56) References Cited

U.S. PATENT DOCUMENTS

| | | | |
|---|---|---|---|
| 2011/0006999 A1* | 1/2011 | Chang | G06F 3/044 345/173 |
| 2011/0187673 A1* | 8/2011 | Yin | G06F 3/044 345/174 |
| 2011/0316803 A1* | 12/2011 | Kim | G06F 3/044 345/173 |
| 2012/0188173 A1* | 7/2012 | Lin | G06F 3/041 345/173 |

FOREIGN PATENT DOCUMENTS

| | | |
|---|---|---|
| CN | 201725302 U | 1/2011 |
| TW | 201037587 A1 | 10/2010 |

\* cited by examiner

*Primary Examiner* — Shamim Ahmed
(74) *Attorney, Agent, or Firm* — Cooper Legal Group LLC (57) ABSTRACT

A touch panel includes a strengthen cover lens and a touch electrode layer. The strengthen cover lens includes a first non-planar sulfate, and is planned with a display region and a peripheral region surrounding the display region. The touch electrode layer is formed, on the first non-planar surface and overlaid on the display region and at least part of the peripheral region for manufacturing a non-planar touch panel.

8 Claims, 6 Drawing Sheets

TOUCH PANEL AND MANUFACTURING METHOD THEREOF

This application claims the benefit of Chinese application No. 201210151066.1, filed on May 16, 2012.

TECHNICAL FIELD

The present disclosure relates to a touch panel and a manufacturing method there and more particularly to a non-planar touch panel and a manufacturing method thereof.

BACKGROUND

In today's market of variety of consuming electronic products, portable electronic products such as personal digital assistant (FDA), mobile phone, notebook and tablet PC touch panels are widely used as man-machine interface.

In order to meet the light weight and less thickness requirement of the electronic products, the touch panel technology has progressed to integrate the glass with touch electrodes and the cover glass, particularly, touch electrodes are being directly manufactured onto the cover glass. This technology efficiently reduces the entire thickness of the touch panel and also, reduces costs of the touch panel.

However, a normal lithography processing technology for directly manufacturing the touch electrodes on the cover glass of touch panel, such as photoresist sputtering, UV exposing and the like, is only applicable for a flat structure. If the photoresist is made from wet films, the non-planar structure would be unevenly coated due to high fluidity; and if the photoresist is made from dry films, the actual demand for less thickness can not be met. In addition, since the non-planar structure has height difference, UV exposure would cause uneven line width and line-spacing. Accordingly the touch panel where the touch electrodes are directly manufactured on the cover glass can not be laminated and applied on the non-planar display device, and hence, limits the applicability of the touch panel.

Presently, a technology of manufacturing the touch electrodes on the non-planar structure has been developed. However, since the manufacturing process is complicated and can only be accomplished by collocating with the conducting layer that made is of special materials, such as by a series of staking steps: spreading dispersing solvent, using cleaning solvent to remove dispersing solvent, steaming cleaning solvent and the like. This there is a need to efficiently accomplish a non-planar touch panel wherein the touch electrodes can be directly manufactured on the cover glass without adding any manufacturing process and changing materials of the conducting layer.

SUMMARY

The present disclosure provides a touch panel and a manufacturing method thereof, the manufacturing method utilizes a strengthen over lens having a non-planar surface as a touch lens that collocates a designed and improved patterning process of the touch electrode to manufacture a non-planar touch panel, so as to use the touch panel in all kinds of non-planar display device and increasing its applicability thereof.

The present disclosure provides a touch panel including a strengthen cover lens and a touch electrode layer. Wherein, the strengthen cover lens includes a first non-planar surface, and is planned with a display region and a peripheral region surrounding the display region; and the touch electrode layer is formed on the first non-planar surface through a patterning process including photoresist spraying and laser exposing, and overlaid on the display region and at least pail of the peripheral region.

The present disclosure also provides a method of manufacturing of the touch panel including the following steps: firstly providing a strengthen cover lens including a first non-planar surface, wherein the strengthen cover lens is planned with a display region and a peripheral region surrounding the display region; then forming a touch electrode layer on the first non-planar surface of the strengthen cover lens by a patterning process technology of photoresist spraying and laser exposing, and covering the display region and at least part of the peripheral region.

The touch panel provided by the present disclosure has characteristics of light weight, less thickness and lower cost. Further, it can also be widely used in all kinds of non-planar display device due to the design of non-planar strengthen cover lens. Compared with the planar lens, the non-planar structure has a more enhanced structural characteristic.

BRIEF DESCRIPTION OF THE DRAWINGS

The following drawings are for the purpose of making the present disclosure more comprehensible. Those drawings are described in details in this specification, and form a part of the embodiment. The embodiments of this specification are described in details with reference to the corresponding wings which are also used for describing action principle of the present disclosure.

It is to be noted that, all drawings are used for specification purpose only. In order to achieve the purpose of interpretation, size and proportion of the components in these drawings may be enlarged or minified. In different embodiments, same component symbols are used to indicate the corresponding or similar characteristics.

DETAILED DESCRIPTION

For those skilled in the art to further understand the present disclosure, several preferred embodiments of the present disclosure accompanied with drawings are described in details below to illustrate forming contents and desired effects of the present disclosure.

Figure 1:
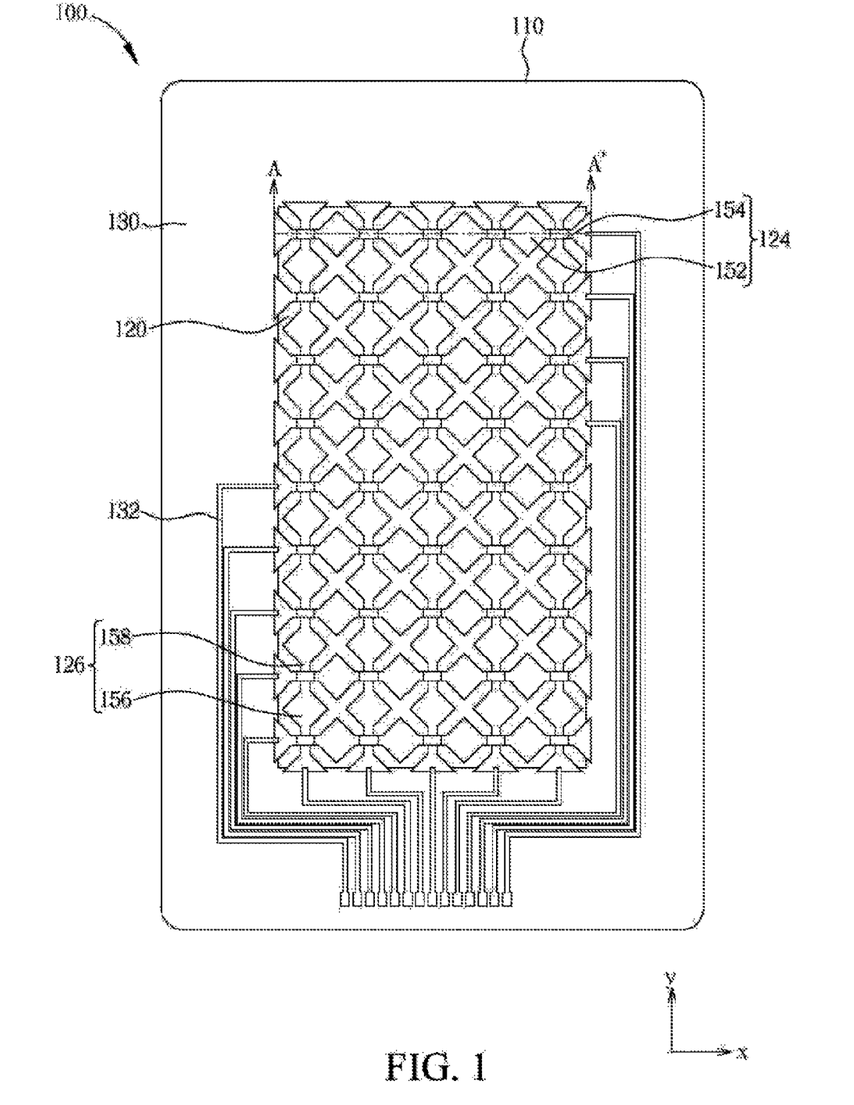
FIG. 1 illustrates a top view diagram of the first preferred embodiment of the present disclosure.
Figure 2:
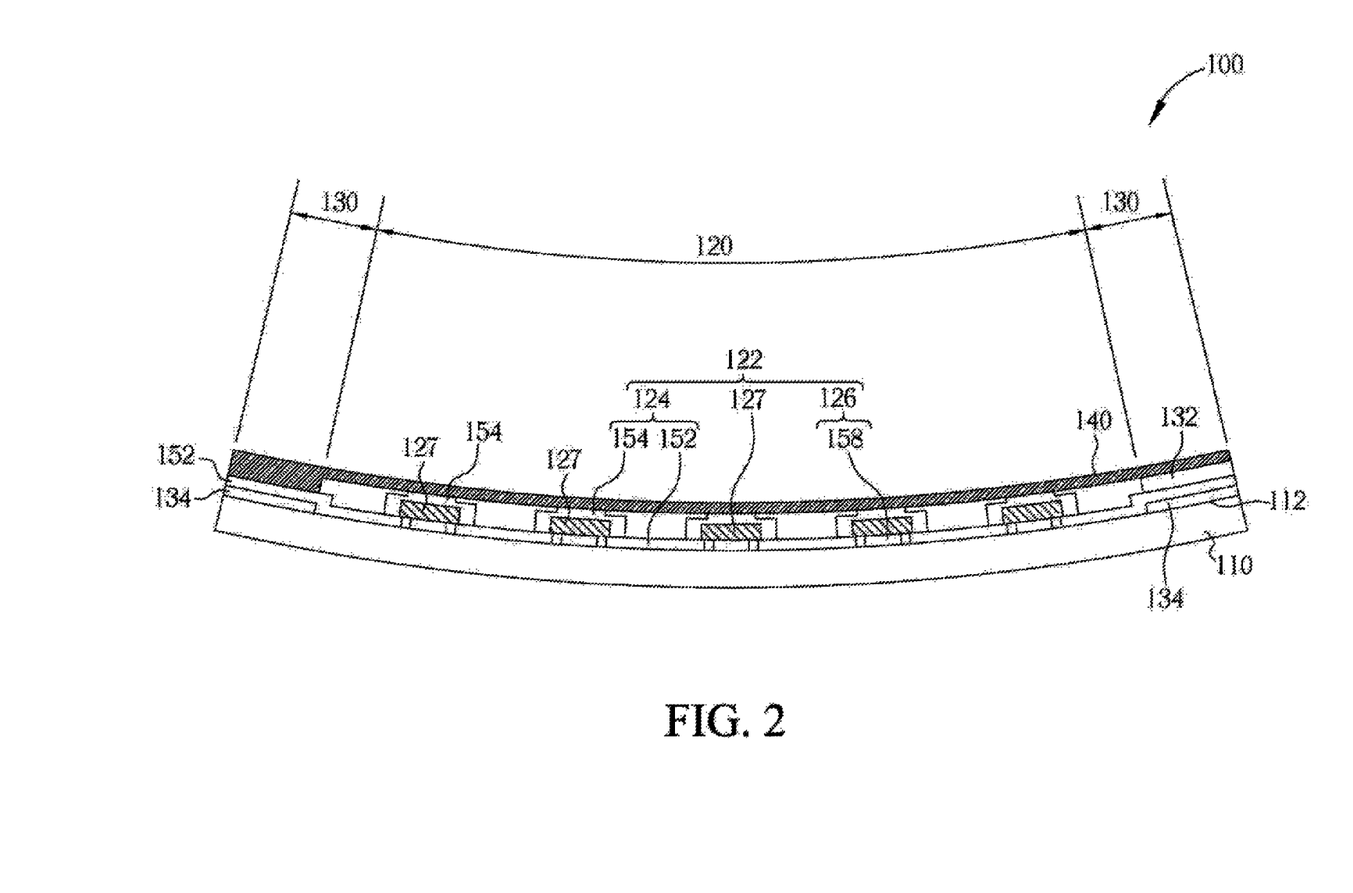
FIG. 2 illustrates a section view diagram of FIG. 1 along a hatching A-A'.
Figure 3:
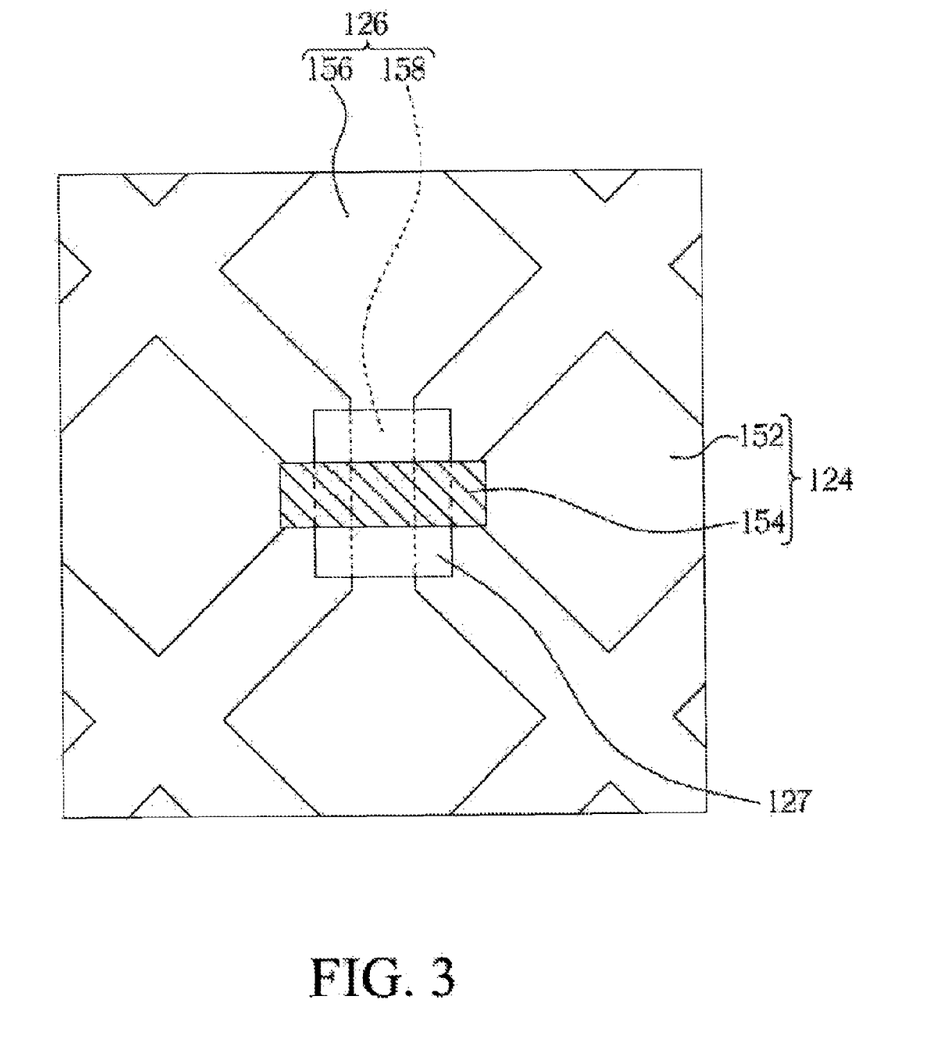
FIG. 3 illustrates a partial enlargement view diagram of the first preferred embodiment of the present disclosure.

With reference to FIG. 1 to FIG. 3. FIG. 1 illustrates a top view diagram of the first preferred embodiment of the present disclosure, FIG. 2 illustrates a section view diagram of FIG. 1 along a hatching A-A', and FIG. 3 illustrates a partial enlargement view diagram of the first preferred embodiment of the present disclosure. In order to facilitate description, each drawing of this embodiment is only for indication purpose to make the present disclosure more comprehensible, detailed proportions thereof may be adjusted according to design requirements.

The touch panel 100 of this embodiment includes a strengthen cover lens 110, and the strengthen cover lens 110 includes a first non-planar surface 112. Wherein, the strengthen cover lens 110 is planned with a display region 120 and a peripheral region 130, and the peripheral region 130 surrounds the display region 120. In general, the display region 120 is a known visible region of the touch panel, and the peripheral region 130 is an opaque shading region. The first non-planar surface 112 can be a smooth curved surface or a surface that is formed of at least two facets having an angle between them.

The touch electrode layer 122 of this embodiment is formed on the first non-planar surface 112 and overlaid on the display region 120 and at least part of the peripheral region 130. The touch electrode layer 122 includes a plurality of first sensing electrodes 124 which are aligned in parallel along the first axis (X axis) of the strengthen cover lens 110 and a plurality of second sensing electrodes 126 which are aligned in parallel along the second axis (Y axis) of the strengthen cover lens 110. The first sensing electrodes 124 and the second sensing electrodes 126 are staggered and insulated from each other. The first sensing electrodes 124 and the second sensing electrodes 126 of this embodiment are similarly formed an the first non-planar surface 112.

Furthermore, each of the first sensing electrodes 124 includes a plurality of first conductive units 152 and a plurality of first conducting wires 154, the first conducting wires 154 connect to two adjacent first conductive units 152 on the X axis; and each of the second sensing electrodes 126 includes a plurality of second conductive units 156 and a plurality of second conducting wires 158, the second conducting wires 158 connect to two adjacent second conductive units 156 on the Y axis. In other words, each of the first sensing electrodes 124 is cascaded by a plurality of first conductive units 152 and a plurality of first conducting wires 154, and each of the second sensing electrodes 126 is cascaded by a plurality of second conductive units 156 and a plurality of second conducting wires 158. Wherein the first sensing electrodes 124 and the second sensing electrodes 126 are staggered at the positions of the first conducting wires 154 and the second conducting wires 158.

Moreover the touch electrode layer 122 further includes an insulation layer 127 located at the junction of the first sensing electrodes 124 and the second sensing electrodes 126 and formed between the first conducting wires 154 and the second conducting wires 158, which makes the first sensing electrodes 124 and the second sensing electrodes 126 insulate from each other, so as to avoid conduction interference of the first sensing electrodes 124 and the second sensing electrodes 126 that impacting touch sensing function without receiving signals correctly. Accordingly, the first conducting wires 154 of the first sensing electrodes 124 form a bridge structure by the disposition of the insulation layer 127.

The touch panel 100 of this embodiment further includes a leads structure 132 located in the peripheral region 130 and electrically connected to the touch electrode layer 122. More particularly the leads structure 132 includes a plurality of connecting wires electrically connected to the corresponding first sensing electrodes 124 and the corresponding second sensing electrodes 126 respectively, so as to transmit driving signals to the touch electrode layer 122 and then transmit sensing signals from the touch electrode layer 122 to the backstage control processor (not shown) for analyzing. Moreover, the touch panel 100 also includes a shading layer 134 located fully in the peripheral region 130 and disposed between the strengthen cover lens 110 and the leads structure 132. The shading layer 134 is normally made of black opaque materials, such as black photoresist for shading all of the components and circuits such as leads structure 132 in the peripheral region 130 to achieve aesthetic effect.

Moreover, the touch panel 100 of this embodiment further includes a protective layer 140 located in the display region 120 and the peripheral region 130 fix covering the touch electrode layer 122 and the leads structure 132 to avoid them from being damaged by chemical treatment and physical impacts.

Aimed to the first embodiment of the present disclosure, the applicable material or other optional groups of each component are as below: the strengthen cover lens 110 is a glass on the surface on which is coated a strengthening layer to form a non-breakable glass. The strengthen cover lens 110 of this embodiment can be used for carrying the sensing electrode layer 122 and as a protecting cover glass. Wherein, the strengthen cover lens 110 is not limited to a single non-planar surface or a double non-planar surface, nor a combination of curved surface or multi-surfaces. The first sensing electrodes 124 and the second sensing electrodes 126 are formed of transparent conductive materials including indium tin oxide (ITO), indium zinc oxide (IZO), cadmium tin oxide (CTO), aluminum zinc oxide (AZO), indium tin zinc oxide (ITZO), zinc oxide, cadmium oxide, hafnium oxide (HFO), indium gallium zinc oxide (InGaZnO), indium gallium zinc magnesium oxide (InGaZnMgO), indium gallium magnesium oxide (InGaMgO) or indium gallium aluminum oxide (InGaAlO) etc. Moreover, the first conducting wires 154 of the first sensing electrodes 124 of this embodiment can be further designed with metal materials, so that the bridge structure formed by the first conducting wires 154 can be relatively strong and unbreakable. Furthermore, material of the leads structure 137 includes conductive metals such as silver, copper or aluminum etc., material of the insulation layer 127 includes insulating materials, such as polyimide (PI), SiO2, SiN, SiCN and SiC etc. Material of the protective layer 140 includes organic materials, such as silicon nitride, silicon oxide and silicon oxynitride, or inorganic materials such as acrylic resin and other applicable materials, but it is not limited hereto.

It is to be noted that, to manufacture each component on the first non-planar surface 112, this embodiment compresses photoresist in high-pressure and sprays photoresist on the non-planar surface, the photoresist would be atomized after spurted out and evenly overlaid on the non-planar surface, so as to solve the problem of unevenly caused by a photoresist sputtering method. In addition, since the non-planar surface has height difference, this embodiment further utilizes laser as light source for exposing, and since diameter tolerance of light beam exposed by laser is extremely low, the problems of uneven line width and line-spacing on the non-planar surface caused by UV exposing can be solved. Exposed line-spacing of laser light source utilized by this embodiment is less than ±5 µm, which has good effect to line width control.

Figure 4:
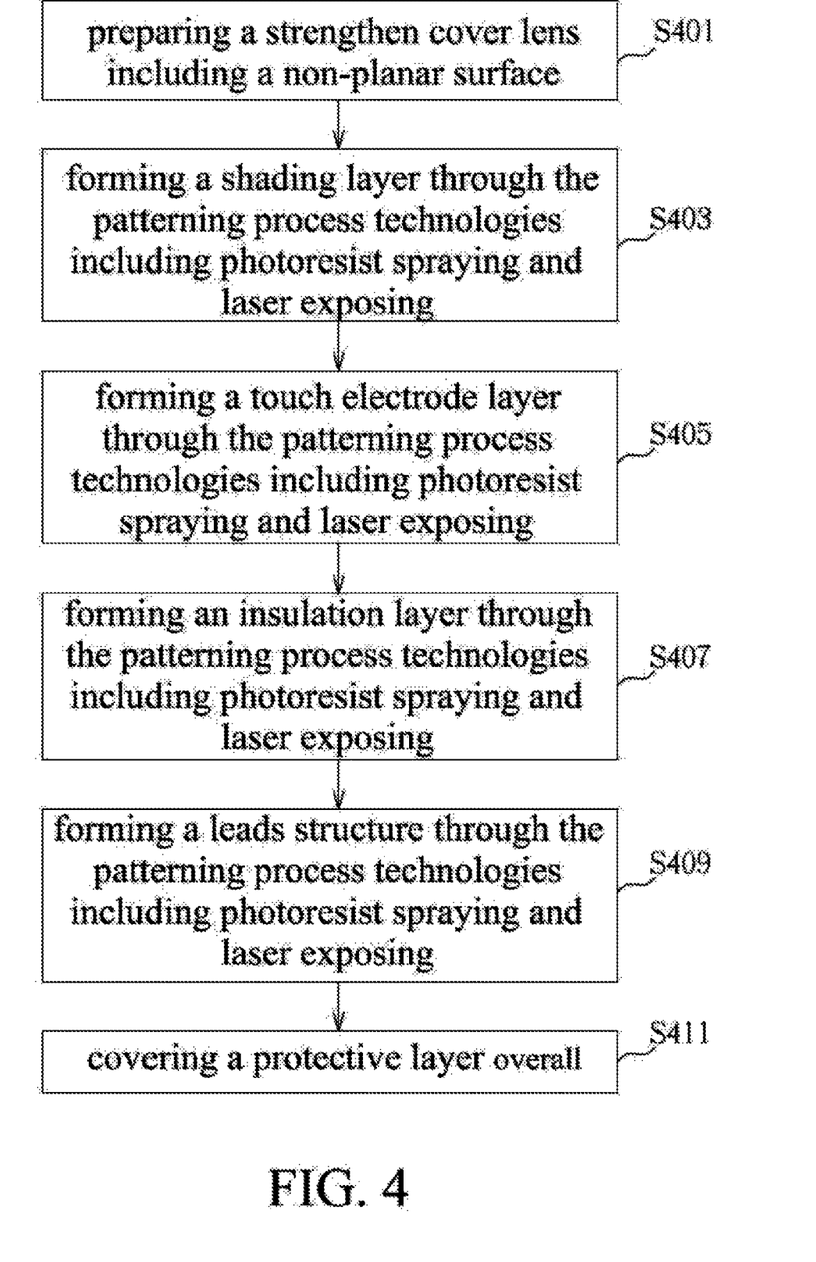
FIG. 4 illustrates a flow chart of a manufacturing method of a touch panel in accordance with the first embodiment of the present disclosure.

The manufacturing method of touch panel of the present disclosure is further illustrated with reference to FIG. 4 based on the sectional structure of FIG. 2. FIG. 4 is a flow chart of a manufacturing method of a touch panel in accordance with the first embodiment of the present disclosure. Firstly, a strengthen cover lens 110 including a first non-planar surface 112 is provided (Step S401). Wherein, the strengthen cover lens 110 is planned with a display region 120 and a peripheral region 130 surrounding the display region 120. A patterned shading layer 134 is then formed by the patterning processes including photoresist spraying and laser exposing, and overall located in the peripheral region 130 (Step S403).

Next, a patterned touch sensing layer 122 is also formed on the first non-planar surface 112 of the strengthen cover lens 110 by the patterning process technologies including photoresist spraying and laser exposing (Step S405), and the touch sensing layer 122 is overlaid on the display region 120 and at least part of the peripheral region 130. Wherein, step of forming the touch sensing layer 122 further includes: forming a plurality of first sensing electrodes 124 and a plurality of second sensing electrodes 126 on the first non-planar surface 112, the first sensing electrodes 124 are aligned in parallel along a first axis (X axis), the second sensing electrodes 126 are aligned in parallel along a second axis (Y axis), and the first sensing electrodes 124 and the second sensing electrodes 126 are staggered. Then, a patterned insulation layer 127 is formed between the first sensing electrodes 124 and the second sensing electrodes 125 by the patterning process technologies including photoresist spraying and laser exposing (Step S407), so that the first sensing electrodes 124 and the second sensing electrodes 126 are insulated from each other.

More particularly, each of the first sensing electrodes 124 is cascaded by a plurality of first conductive units 152 and a plurality of first conducting wires 154; and each of the second sensing electrodes 126 is cascaded by a plurality of second conductive units 156 and a plurality of second conducting wires 158. The method as disclosed in this embodiment can form a plurality of first conductive units 152, a plurality of first conducting wires 154 and a plurality of second conductive units 156 first, wherein the first conductive units 152 and the first conducting wires 154 are electrically connected with each other on the first axis to cascade the first sensing electrode 124. An insulation layer 127 is then formed above each of the conducting wiles 154. Lastly, a plurality of second conducting wires 158 is formed above the insulation layer 127 and electrically connected to two adjacent conductive units 156 on the second axis for cascading as the second sensing electrodes 126, and the first sensing electrodes 124 and the second sensing electrodes 126 are insulated from each other.

Next, a patterned leads structure 132 is formed in the peripheral region by the patterning process technologies including photoresist spaying and laser exposing (Step S409) to electrically connect the first axial electrodes 124 and the second axial electrodes 126. Accordingly, the foregoing shading layer 134 is disposed between the strengthen cover lens 110 and the leads structure 132 to shade the leads structure 132. Moreover, the leads structure 132 is preferably made of metal materials having good conductivity to increase conduction velocity.

It is to be noted that, since this embodiment manufactures the touch electrode layer 122, the leads structure 132 and the shading layer 134 on the first non-planar surface 112 of the strengthen cover lens 110, the above patterning process is accomplished by the process technologies such as photoresist spraying and laser exposing, so as to avoid the problems of uneven coating of photoresist and uneven line width and line spacing.

Lastly protective layer 140 is formed on the display region 120 and the peripheral region 130 (Step S411) for covering the touch electrode layer 122 and the leads structure 132, so as to avoid the touch electrode layer 122 being damaged by chemical treatment or physical impact.

Different embodiments of the touch panel of the present disclosure are simply described below. The following description is mainly focused on the difference between each embodiment, and does not repeatedly describe the similarity. Moreover, same components in each embodiment of the present disclosure are indicated by same symbols for contraction of each embodiment.

Figure 5:
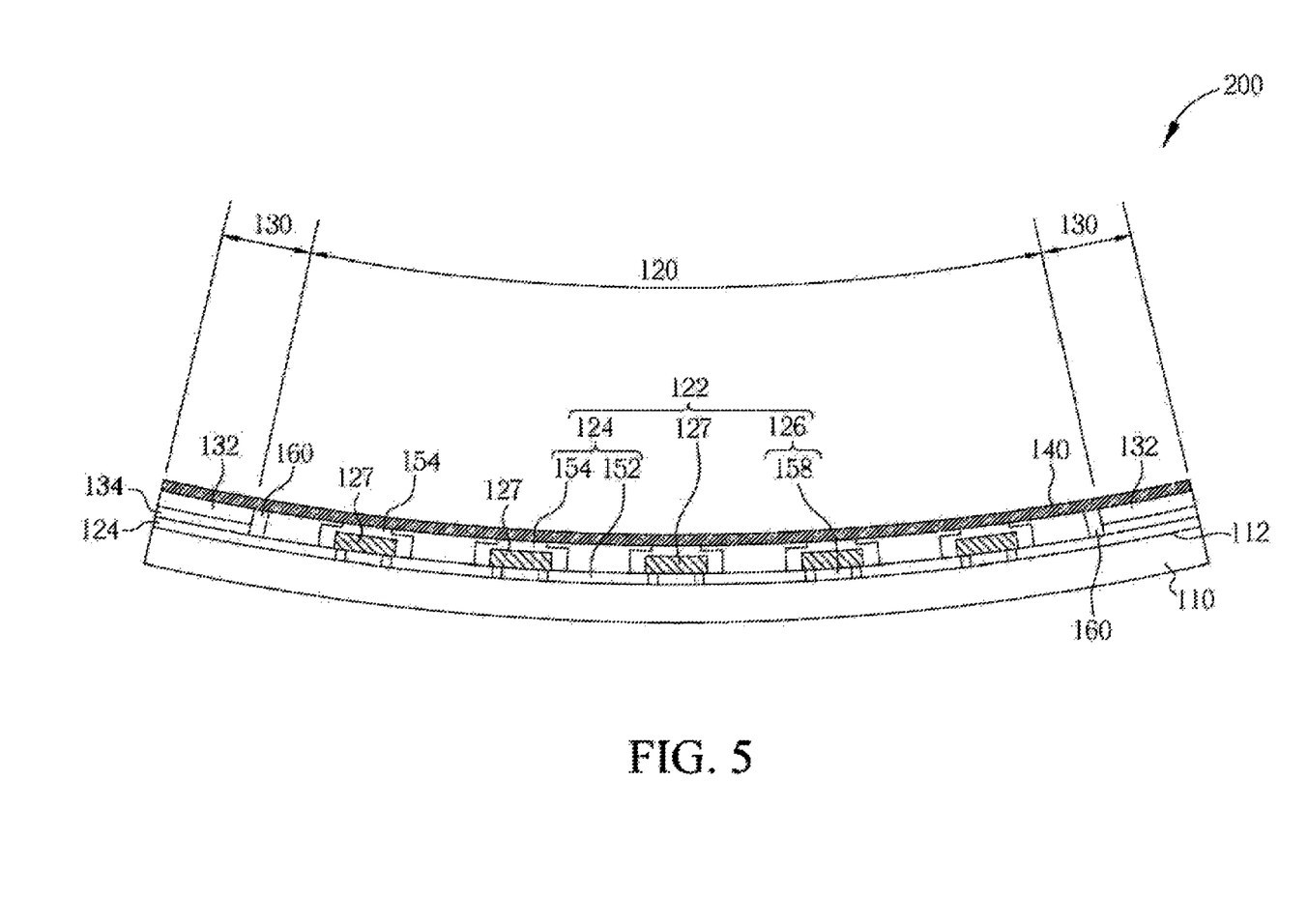
FIG. 5 illustrates a flow chart of a manufacturing method of a touch panel in accordance with the second embodiment of the present disclosure.

The second embodiment of the present disclosure is as shown in FIG. 5. FIG. 5 illustrates a flow chart of a manufacturing method of a touch panel in accordance with the second embodiment of the present disclosure. Compared with the first embodiment of the present disclosure, this embodiment provides a touch panel 200, the difference from the first embodiment is that the shading layer 134 of this embodiment is formed after the touch electrode layer 122 has been accomplished, wherein the shading layer 134 is located between the touch electrode layer 122 and the leads structure 132. Under this framework, the touch panel 200 further includes a plurality of conductive adhesives 160 for electrically connecting the first sensing electrodes 124 and the second sensing electrodes 126 to the leads structure 132. Other components and steps of this embodiment are all same as those of the first embodiment of the present disclosure, and not described here again. Moreover, the conductive adhesive 160 of this embodiment can be a transparent conductive adhesive and is disposed at the junction of the display region 120 and the peripheral region 130. In other embodiments, the conductive adhesive 160 may be the same color as the shading layer 134, and is filled in a perforated structure of the shading layer 134 for achieving the purpose of electrical connection. However, the selection of the conductive adhesive 160 may be adjusted according to actual design requirement, and is not limited by the present disclosure.

Figure 6:
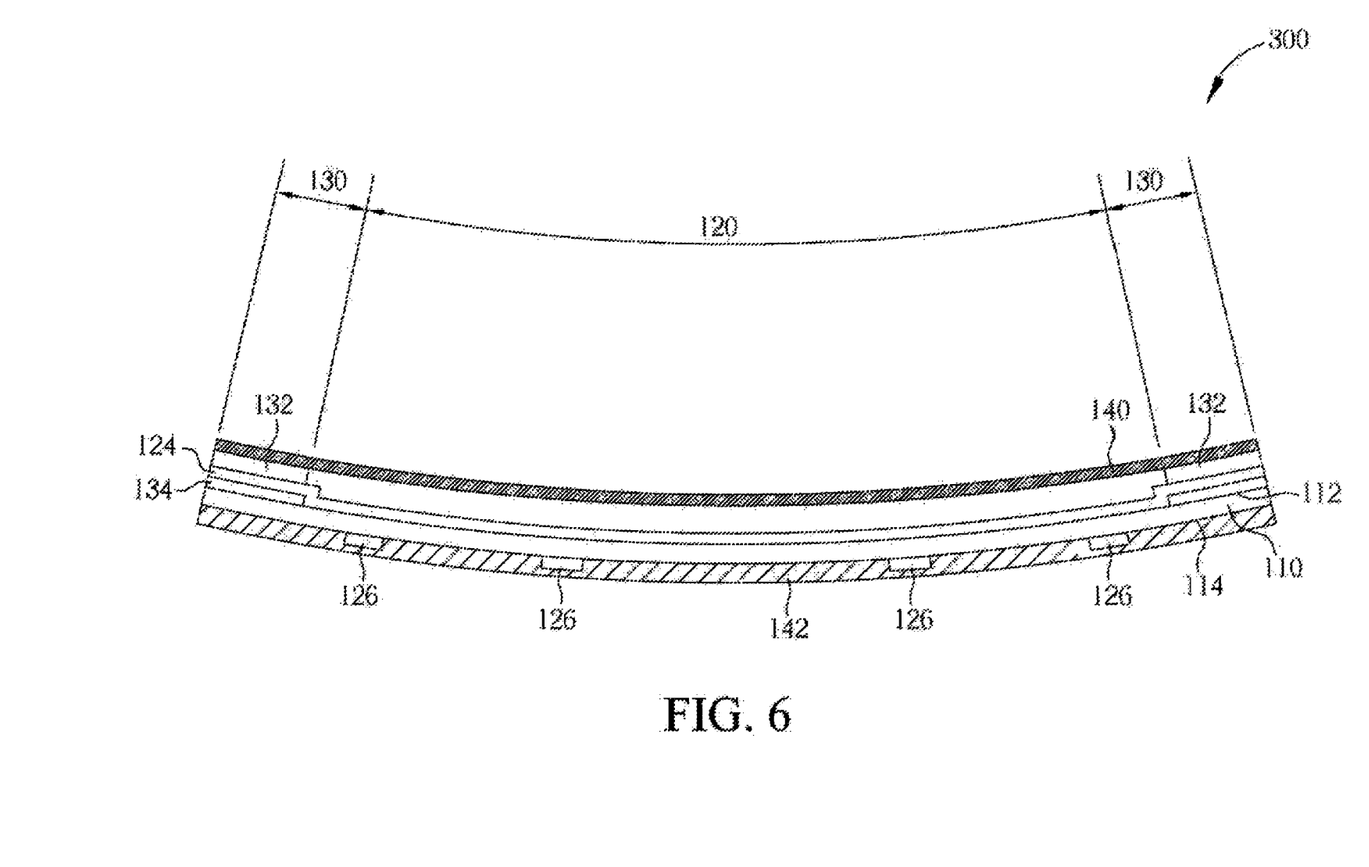
FIG. 6 illustrates a flow chart of a manufacturing method of a touch panel in accordance with the third embodiment of the present disclosure.

It is to be noted that, the touch electrode layer 122 of the present disclosure is not limited to only forum on a specific surface of the strengthen cover lens 110, and further the touch electrode layer 122 can also be separated to form on the double-surface of the strengthen cover lens 110. As shown in FIG. 6, FIG. 6 illustrates a flow chart of a manufacturing method of a touch panel in accordance with the third embodiment of the present disclosure. This embodiment provides a touch panel 300, the difference from the first embodiment is that the touch panel 300 of this embodiment father includes a second non-planar surface 114 corresponding to the first non-planar surface 112. Wherein, the second non-planar surface 114 can be a smooth curved surface or a surface that is formed of at least two facets having an angle between them.

The first sensing electrodes 124 of this embodiment are formed on the first non-planar surface 112, and the second sensing electrodes 126 are formed on the second non-planar surface 114. Wherein, a plurality of first sensing electrodes 124 aligned in parallel along the first direction and a plurality of second sensing electrodes 126 aligned in parallel along the second direction are respectively formed on the two non-planar surfaces of the strengthen cover lens 110. Under this framework, the strengthen cover lens 110 is also a insulation layer, such that the first sensing electrodes 124 and the second sensing electrodes 126 are staggered and insulated from each other for touch sensing operation. After that, a leads structure 132 is formed to electrically connect to the first sensing electrodes 124 and the second sensing electrodes 126. Lastly, a protective layer 140 is formed to fully cover the leads structure 132 and the first sensing electrodes 124, and a hard coating layer 142 is formed to overall cover the leads structure 132 and the second sensing electrodes 126.

In conclusion, the present disclosure provides a non-planar touch panel and a manufacturing method thereof. The patterning process of the present disclosure utilizes the photoresist spraying and laser exposing methods to respectively replace the photoresist spurting and UV exposing methods, so as to achieve locating the touch electrode layer, the leads structure and the shading layer on a non-planar lens. Depth of a surface stress layer can reach more than 20 μm and surface stress value can reach more than 800 Mpa of the touch panel manufactured by the method of the present disclosure.

Consequently, the touch panels of the present disclosure and made by the manufacturing method thereof have characteristics of light weight less thickness, and lower cost, and also have a advantage of being widely used in all kinds of non-planar display device due to the design of non-planar strengthen cover lens. Compared with the planar lens, the non-planar structure has a more enhanced structural characteristics.

The foregoing description is the embodiment of the present disclosure only and not intent to limit the scope of the present disclosures.

What is claimed is:

1. A manufacturing method of the touch panel, comprising the steps of:
   providing a strengthen cover lens including a first non-planar surface, wherein the strengthen cover lens is planned with a display region and a peripheral region surrounding the display region; and
   utilizing a patterning process technology including photoresist spraying and laser exposing to form a touch electrode layer on the first non-planar surface of the strengthen cover lens, which overlays on the display region and at least part of the peripheral region.

2. The manufacturing method of the touch panel of claim 1, wherein the first non-planar surface is a smooth curved surface and a surface which is formed of at least two facets having an angle in between.

3. The manufacturing method of the touch panel of claim 1, further comprises:
   forming a leads structure in the peripheral region to electrically connect to the touch electrode layer; and
   forming a shading layer to locate fully in the peripheral region and dispose between the strengthen cover lens and the leads structure;
   wherein, the steps of forming the leads structure and the shading layer utilize the patterning process technology including photoresist spraying and laser exposing.

4. The manufacturing method of the touch panel of claim 3, further comprises:
   forming a first protective layer on the display region and the peripheral region for covering the touch electrode layer and the leads structure.

5. The manufacturing method of the touch panel of claim 1, wherein the step of forming the touch electrode layer further comprises:
   forming a plurality of first sensing electrodes and a plurality of second sensing electrodes on the first non-planar surface, wherein the first sensing electrodes are aligned parallel along a first axis, and the second sensing electrodes are aligned in parallel along a second axis, wherein the first sensing electrodes and the second sensing electrodes are staggered and insulated from each other; and
   forming an insulation layer between the first sensing electrodes and the second sensing electrodes to make the first sensing electrodes and the second sensing electrodes insulate from each other.

6. The manufacturing method of the touch panel of claim 1, wherein the strengthen cover lens further comprises a second non-planar surface corresponding to the first non-planar surface.

7. The manufacturing method of the touch panel of claim 6, wherein the step of forming, the touch electrode layer further comprises:
   forming a plurality of first sensing electrodes which are aligned in parallel along a first axis on the first non-planar surface; and
   forming a plurality of second sensing electrodes which are aligned in parallel along a second axis on the second non-planar surface;
   wherein, the first sensing electrodes and the second sensing electrodes are staggered and insulated from each other.

8. The manufacturing method of the touch panel of claim 6, wherein the second non-planar surface is a smooth curved surface or a surface which is formed of at least two facets having an angle in between.

* * * * *